(12) United States Patent
Goldner et al.

(10) Patent No.: US 6,422,765 B1
(45) Date of Patent: Jul. 23, 2002

(54) MODULAR APPARATUS FOR PACKAGING AND INTERFACING A PHOTODIODE WITH AN OPTICAL FIBER

(75) Inventors: Eric L. Goldner, Valencia; Douglas E. Holmes, Camarillo; Carl J. Krantz, Simi Valley, all of CA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/365,306

(22) Filed: Jul. 30, 1999

(51) Int. Cl.[7] .................................................. G02B 6/42
(52) U.S. Cl. ............................ 385/92; 385/94; 250/239
(58) Field of Search ................ 385/92, 94; 250/227.11, 250/227.14, 227.24, 239; 257/433, 698, 699

(56) References Cited

U.S. PATENT DOCUMENTS 4,647,148 A * 3/1987 Katagiri ..................... 350/96.2
6,092,935 A * 7/2000 Althaus et al. ............... 385/93

* cited by examiner

Primary Examiner—Frank G. Font
Assistant Examiner—Andrew H. Lee
(74) Attorney, Agent, or Firm—Elliott N. Kramsky

(57) ABSTRACT

Modular apparatus for packaging and interfacing a planar photodiode with an optical fiber terminated in a ferrule. An elongated terminal pin protrudes from a header of a generally-cylindrical housing. The ferrule end of the fiber is received at the opposed end of the housing and aligned with a disk-shaped photodetector fixed to the end of the pin interior to the housing. A wire is bonded to a surface of the photodetector and, via the conductive casing of the header, to the housing to provide a miniaturized single-pin pigtailed modular arrangement that is readily adaptable for automated manufacturing process.

25 Claims, 4 Drawing Sheets

MODULAR APPARATUS FOR PACKAGING AND INTERFACING A PHOTODIODE WITH AN OPTICAL FIBER

BACKGROUND

1. Field of the Invention

The present invention relates to the packaging of photodetectors for use in fiber optic systems. More particularly, this invention pertains to a miniaturized housing for a photodetector.

2. Description of the Prior Art

Photodetectors are essential elements of most current optical systems. Such devices convert optical energy to electrical signals that are then processed to provide system outputs and/or employed to generate control signals.

The more-or-less universal presence of such devices in optical and electro-optical systems, coupled with their significant functional roles, makes it imperative that photodetectors be reliably and securely integrated into those systems and compatible with processes for efficient manufacture of such systems. Presently, fiber optic photodetectors are packaged in one of two forms: pigtailed and unpigtailed (usually electrically leaded). Pigtailed photodiodes are generally relatively bulky while non-pigtailed photodetectors require external connection to the optical fiber. This can be costly and may subject the connection to environmentally-induced stability problems. In addition, such devices require at least two pin terminals. This makes such connectors generally unsuitable for use in applications requiring repeated insertion and extraction due to the fragile nature of the electrical leads.

SUMMARY OF THE INVENTION

The present invention addresses the preceding shortcomings of the prior art by providing modular apparatus for packaging and interfacing a planar photodetector having opposed planar surfaces with a terminal end of an optical fiber fixed within an elongated ferrule. Such apparatus includes an elongated pin of conductive composition. The first planar surface of the photodiode is fixed to one end of the pin.

A generally-cylindrical, substantially-hollow housing of conductive composition includes opposed first and second end portions. A terminal portion of the pin extends within the first end portion of the housing. The elongated ferrule extends within the second end portion of the housing. The longitudinal axis of the ferrule and the second elongated pin are aligned with the longitudinal axis of the housing whereby a terminal end of the fiber is aligned with a terminal end of the pin within the housing. The fiber extends axially exteriorly of the housing.

The second planar surface of the photodetector is in electrical connection with the housing.

The foregoing features and advantages of the invention will become further apparent from the detailed description that follows. Such description is accompanied by a set of drawing figures in which numerals, corresponding to numerals of the written description, point to the various features of the invention. Like numerals point to like features of the invention throughout both the written description and the drawing figures.

BRIEF DESCRIPTION OF THE DRAWING FIGURES

DETAILED DESCRIPTION OF THE PREFERRED EMBODIMENT

Figure 1:
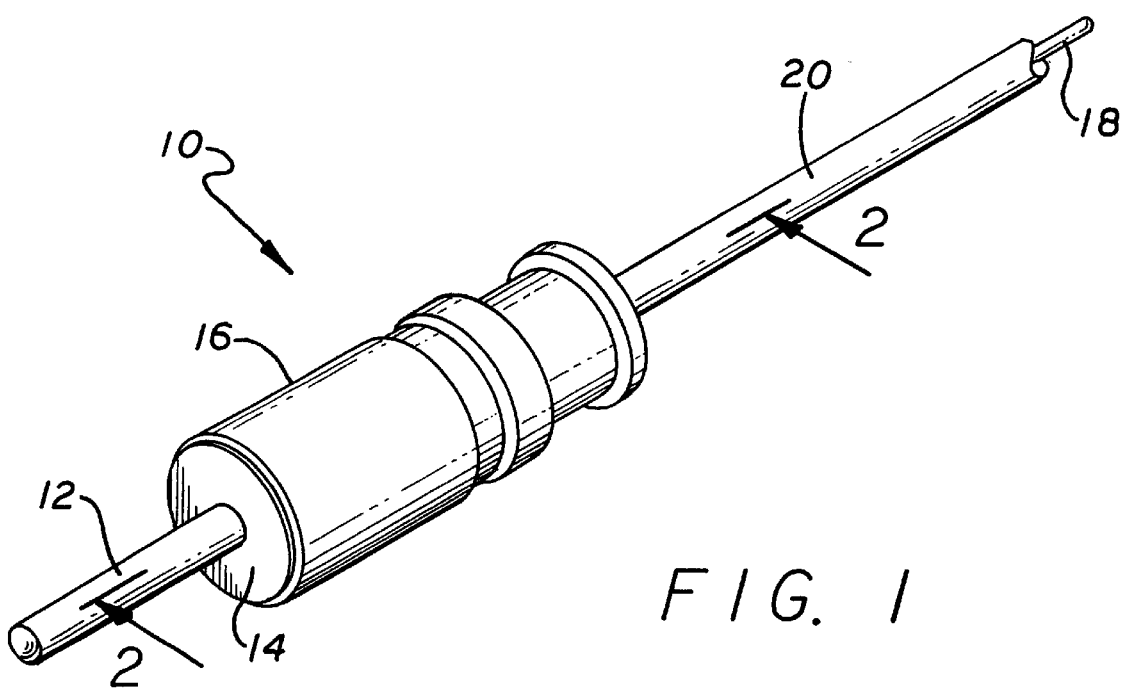
FIG. 1 is a perspective view of the modular apparatus of the invention for interfacing a photodiode with an optical fiber.

FIG. 1 is a perspective of the modular apparatus of the invention interfacing a photodiode with an optical fiber. Such apparatus 10 includes an elongated pin terminal 12 for electrical connection to associated circuitry (not shown).

The pin 12 is received within a header 14 which, in turn, is received within an elongated housing 16. The housing 16 is formed of electrically-conductive, preferably metallic, material. An optical fiber 18 enters the housing 16 at the opposed end. External protection for the fragile fiber 18 is provided by a strain relief mechanism that includes an elongated cylindrical sheath 20.

Figure 2:
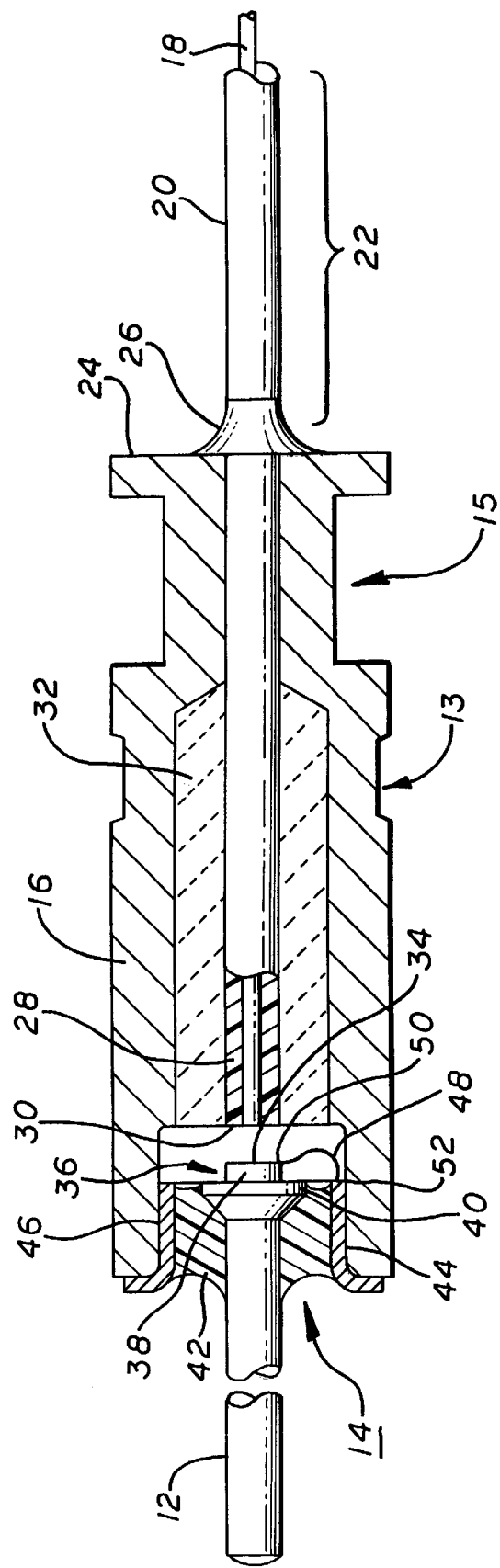
FIG. 2 is a side elevation view of the invention in cross-section taken along line 2—2 of FIG. 1.

FIG. 2 is a side elevation view of the invention in cross-section taken along line 2—2 of FIG. 1. As can be seen, the strain relief structure 22 for protecting the optical fiber 18 includes not only the elongated sheath-like member 20 but, adjacent the end wall 24 of the housing 16, an elastomeric member 26 of substantially-truncated conical shape. Together, the members 20 and 26 provide a region of protection and separation from the housing 16 to allow an assembler to handle and work with the apparatus 10 without danger, for example, of over-stressing the optical fiber 18 due to bending in a tight radius.

The terminal end of the fiber 18 is received within a ferrule fabricated of, for example, quartz. Suitable ferrules include silica capillary tubes such as those manufactured by, and commercially available from, GSI Lumonics of Glendale, Arizona. Such a ferrule 28 is a standard means for terminating the end of an optical fiber. Generally, the terminal end 30 of the ferrule 28 (and the enclosed optical fiber 18) is highly polished to effect desired optical quality to maximize the intensity of light received at a photodetector.

The ferrule 28 for receiving the terminal end of the optical fiber 18 is aligned with the longitudinal axis of the cylindrical housing 16 and held centrally therein by means of adhesive 32 that fills the portion of the cavity internal to the housing 16 which surrounds it. An appropriate adhesive for this purpose is EPOXY. Alternatively, glass frit may be employed.

The flat surface 30 of the ferrule is held in alignment with, and in opposition to, a planar surface 34 of a photodetector 36 which is typically a square disk shape. The opposed planar surface 38 of the photodetector 36 is fixed to the flared end 40 of the elongated terminal pin 12.

As can be seen in FIG. 2, the flared end 40 and adjacent portion of the elongated terminal pin 12 are held so that the axis of the elongated terminal pin 12 is aligned with the coincident axes of the fiber 18 and the housing 16 by means of a potting adhesive 42 that fills the interior of a surrounding outer case 44 of the header 14. The case 44 is fabricated of electrically-conductive, preferably metallic, material and is fixed to the interior of the housing 16 by means of an electrically-conductive adhesive 46 such as EPOXY. Such a header assembly is commercially available from, for example, Schott Glaswerke of Mainz, Federal Republic of Germany. The housing 16, therefore, serves as an anode connection, an electrical shield and a mechanical structure.

Electrical connection between the planar surface 34 of the photodetector 36 and the case 44 of the header 14 is provided by a wire 48 that provides physical connection therebetween. The wire 48 is preferably ball bonded to the anode surface 34 and to the case 44 at opposed ends 50 and 52 respectively for proper electrical contact and ease of manufacture.

By providing electrical connection between the anode surface 34 and the header casing 44 (which, in turn, is conductively coupled to the housing 16), the invention eliminates any need for a second ("grounding") terminal pin. As such, the resultant device is highly miniaturized and suitable for manufacturing processes employing, for example, pick-and-place apparatus for insertion into standard sockets within a mounting card for the purpose of receiving apparatus 10. The device permits the loading of socket pairs (board surface and subsurface for receiving the housing 16 and the terminal pin 12 respectively) into a dispensing magazine as a pair or multiple pairs (multiple detectors). The dispensing magazine can then be loaded on a standard electronics pick-and-place machine for fully automated location onto a circuit card and subsequent wave or vapor phase soldering, for instance.

Figure 5:
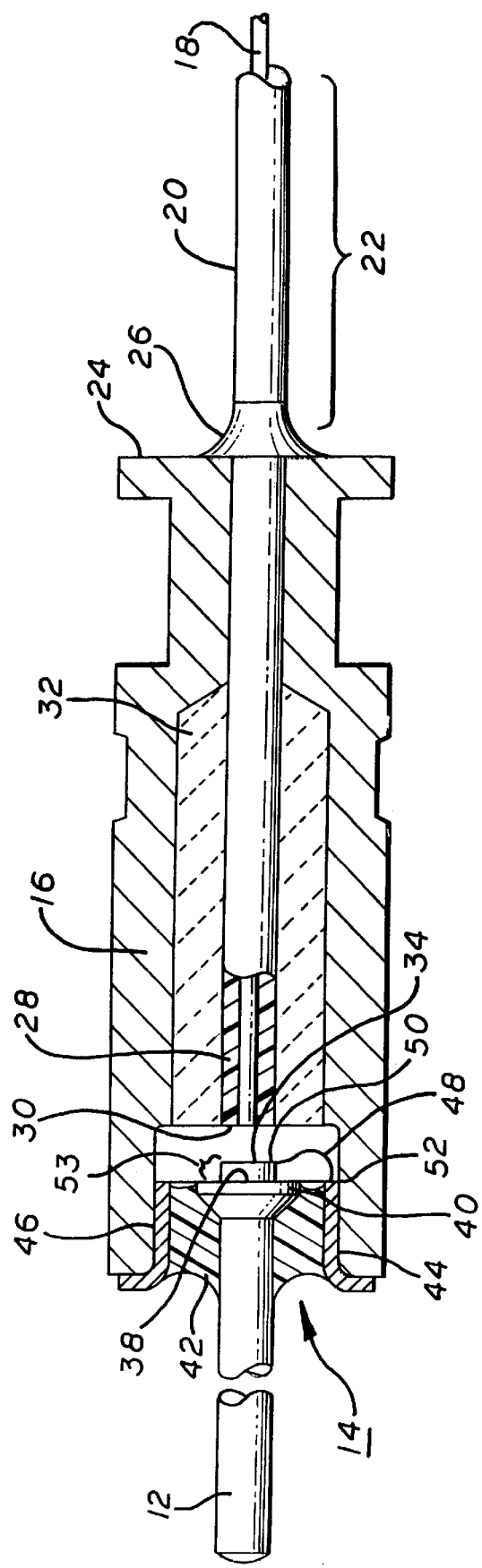
FIG. 5 is a side elevation view in cross section of a third alternative embodiment of the invention.

It will be appreciated that the photodetector 36 may comprise various arrangements wherein either of the planar surfaces 34 and 38 may serve as anode or cathode. Further, certain photodetector configurations locate both anode and cathode on a single planar surface. In such case, as illustrated in FIG. 5, the wire 48 provides electrical connection between the planar surface 34 and the casing 44 while a wire 53 provides electrical connection between the planar surface 34 and the flared end 40 of the terminal pin 12.

Figure 3:
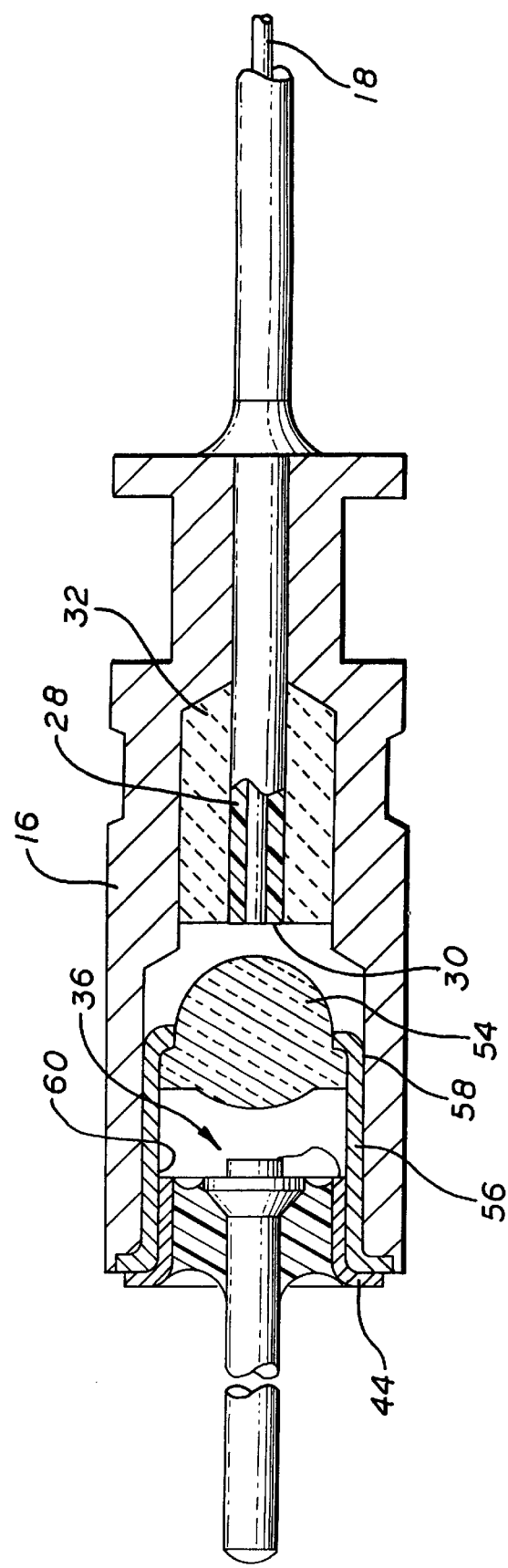
FIG. 3 is a side elevation view in cross-section of an alternative embodiment the invention.

FIG. 3 is a side elevation view in cross-section of an alternative embodiment of the invention. Numerals indicating like structures to those of the preceding embodiment are indicated by like numerals. The embodiment of FIG. 3 differs from that of the prior figure by the inclusion of a focusing lens 54 intermediate the planar surface 34 of the photodetector 36 and the polished surface 30 of the ferrule 28 (and the fiber 18). The lens 54 is held at one end of a generally-cylindrical fitting 56 of conductive, preferably metallic, composition. Such an assembly is commercially available from Schott Glaswerke. The fitting 56 is fixed to the conductive housing 16 by means, for example, of a conductive EPOXY or solder process and, at its interior, is fixed to the case 44 of the header 14 by like means. Alternatively, the case 44, the fitting 56 and the housing 16 may be welded to one another. Regardless, the presence of the fitting 56 in no way disrupts the conductive connection of the planar surface 34 of the photodetector 36 to the housing 16.

Figure 4:
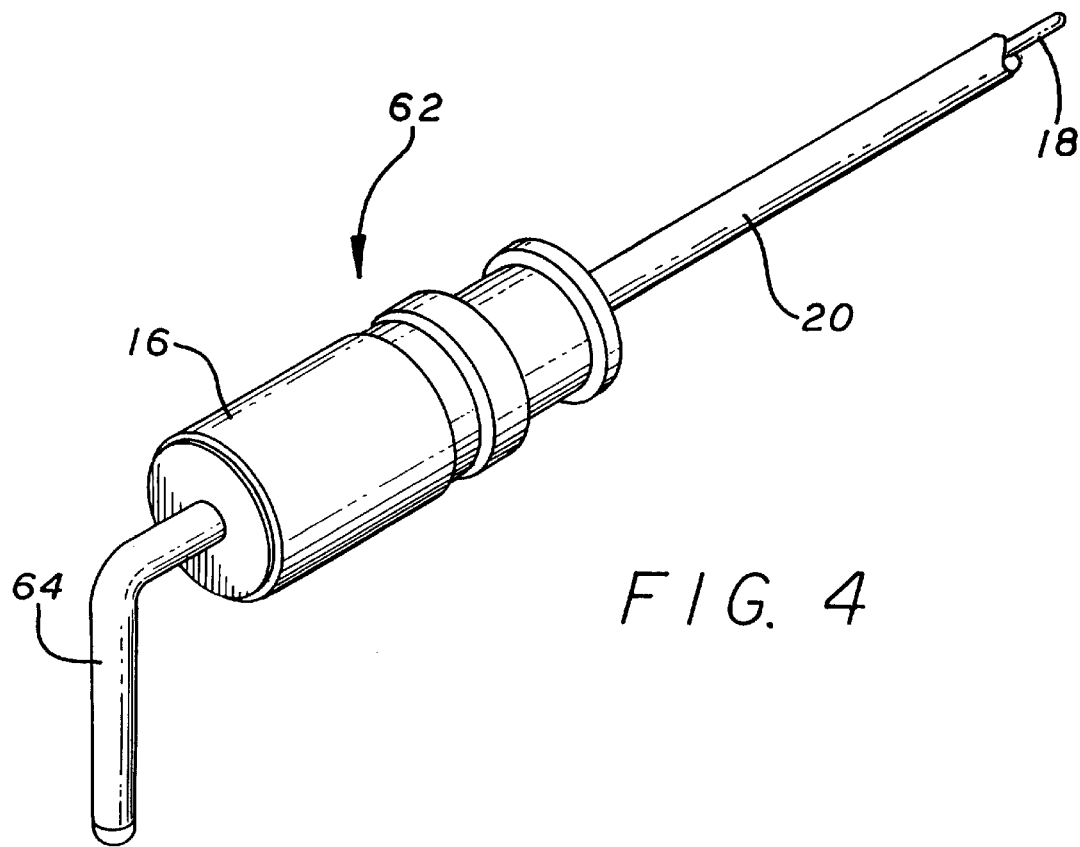
FIG. 4 is a perspective view of the invention in accordance with a second alternative embodiment.

FIG. 4 is a perspective view of a further alternative embodiment of the invention. The embodiment 62 of FIG. 4 differs from those preceding by inclusion of an L-shaped terminal pin 64. By forming the pin 64 at a right angle with respect to the longitudinal axis of the housing 16, the apparatus of FIG. 4 is suitable for clipping to a board-mounted clip that provides grounding while the pin engages a socket within the board. Such a configuration is consistent with automated placement and soldering of a single socket into a circuit board. This configuration is particularly suitable for applications requiring low clearance parts and eliminates the need for fiber to extend normal to the circuit board surface. Grooves 13 and 15 are incorporated into the housing 16 to aid handling, insertion, extraction and capture.

Thus it is seen that the present invention provides a modular pigtailed housing for a photodetector. The invention provides very low capacitance and excellent electromagnetic shielding, providing environmental stability and mounting flexibility by means of an ultra-small envelope that is consistent with low cost board level fabrication and assembly processes. The invention is compatible with insertion into a standard socket or for clipping to a board-mounted clip for grounding while the pin engages the socket. By providing a device that employs only a single pin, the apparatus presents less potential for incorrect insertion, bending or breaking of pins during system assembly and allows for repeated insertion and extraction of the assembly. In an alternative embodiment, the device may incorporate a focusing lens for applications that require focusing of a maximum amount of light onto a small area detector. Such requirements characterize low noise applications (e.g. fiber optic gyroscope).

While the invention has been described with reference to its presently-preferred embodiment, it is not limited thereto. Rather, this invention is limited only insofar as it is defined by the following set of patent claims and includes within its scope all equivalents thereof.

What is claimed is:

1. Modular apparatus for packaging and interfacing a planar photodetector having opposed planar surfaces with a terminal end of an optical fiber fixed within an elongated ferrule, said apparatus comprising, in combination:
    a) an elongated pin of conductive composition;
    b) a first planar surface of said photodetector being fixed to one end of said pin;
    c) a generally-cylindrical, substantially-hollow housing of conductive composition including opposed first and second end portions;
    d) a terminal portion of said pin extending within a first end portion of said housing;
    e) said elongated ferrule extending within said second end portion of said housing;
    f) the longitudinal axis of said ferrule and said elongated pin being aligned with the longitudinal axis of said housing whereby a terminal end of said fiber is aligned with a terminal end of said pin within said housing;
    g) said fiber extending axially exteriorly of said housing; and
    h) the second planar surface of said photodetector being in electrical connection with said housing.

2. Modular apparatus as defined in claim 1 further including:
    a) a generally-cylindrical header;
    b) said header comprising an outer case of conductive composition and an interior of non-conductive composition;
    c) said header being received at one end of said housing so that said case is conductively fixed to the interior of said housing;
    d) said ferrule being received within said header; and
    e) an elongated conductor being bonded at its opposed ends to said second planar surface of said photodetector and to said case.

3. Modular apparatus as defined in claim 2 wherein said header is further characterized in that:
    a) said case is of metallic composition; and
    b) the interior of said case being potted with a non-conductive material.

4. Modular apparatus as defined in claim 3 wherein said non-conductive material is EPOXY.

5. Modular apparatus as defined in claim 2 further characterized in that:
   a) said elongated pin including a flared end terminated in an end wall; and
   b) said first planar surface of said photodetector being fixed to said end wall.

6. Modular apparatus as defined in claim 5 further characterized in that:
   a) said header includes a wall transverse to the axis of rotation of and within said housing; and
   b) said end wall of said pin is substantially coincident with said wall of said header.

7. Modular apparatus as defined in claim 1 wherein said ferrule is surrounded by potting material filling the surrounding section of said housing.

8. Modular apparatus as defined in claim 7 wherein said potting material is EPOXY.

9. Modular apparatus as defined in claim 2 wherein said outer case of said header is conductively fixed to the interior of said housing by means of an electrically non-conductive adhesive.

10. Modular apparatus as defined in claim 2 wherein said outer case of said header is welded to the interior of said housing.

11. Modular apparatus as defined in claim 1 further characterized in that a strain relief member surrounds said portion of said fiber outside said housing.

12. Modular apparatus as defined in claim 11 wherein said strain relief member is fixed to said second end of said housing.

13. Modular apparatus as defined in claim 12 wherein said strain relief member includes an elastomeric member of substantially-truncated conical shape.

14. Modular apparatus as defined in claim 13 wherein said strain relief member additionally includes:
   a) an elongated member;
   b) said elongated member surrounding a portion of said optical fiber outside said housing; and
   c) said elongated member being fixed to said substantially truncated conical member.

15. Modular apparatus as defined in claim 1 wherein said pin is substantially straight.

16. A module as defined in claim 1 wherein said pin is generally L-shaped.

17. Modular apparatus as defined in claim 2 further including:
   a) a lens; and
   b) a substantially-hollow fitting for retaining said lens within said housing intermediate said anode surface of said photodetector and the terminal end of said ferrule.

18. Modular apparatus as defined in claim 17 further characterized in that:
   a) said fitting is generally-cylindrical and of conductive composition; and
   b) said fitting is conductively coupled to said outer case and to the interior of said housing.

19. Modular apparatus as defined in claim 18 wherein said fitting is fixed to said outer case and to the interior of said housing.

20. Modular apparatus as defined in claim 19 wherein said outer case, said fitting and the interior of said housing are adhesively bonded to one another.

21. Modular apparatus as defined in claim 19 wherein said outer case, said fitting and said interior of said housing are welded to one another.

22. Modular apparatus as defined in claim 2 further including a second elongated conductor bonded at its opposed ends to said second planar surface of said photodetector and to said terminal portion of said pin.

23. Modular apparatus as defined in claim 3 wherein said non-conductive material is glass frit.

24. Modular apparatus as defined in claim 2 wherein said outer case of said header is soldered to the interior of said housing.

25. Modular apparatus as defined in claim 19 wherein said outer case, said fitting and said interior of said housing are soldered to one another.

* * * * *